Feb. 16, 1932.   E. A. BOLT   1,845,121
WASTE TRAP
Filed May 7, 1931
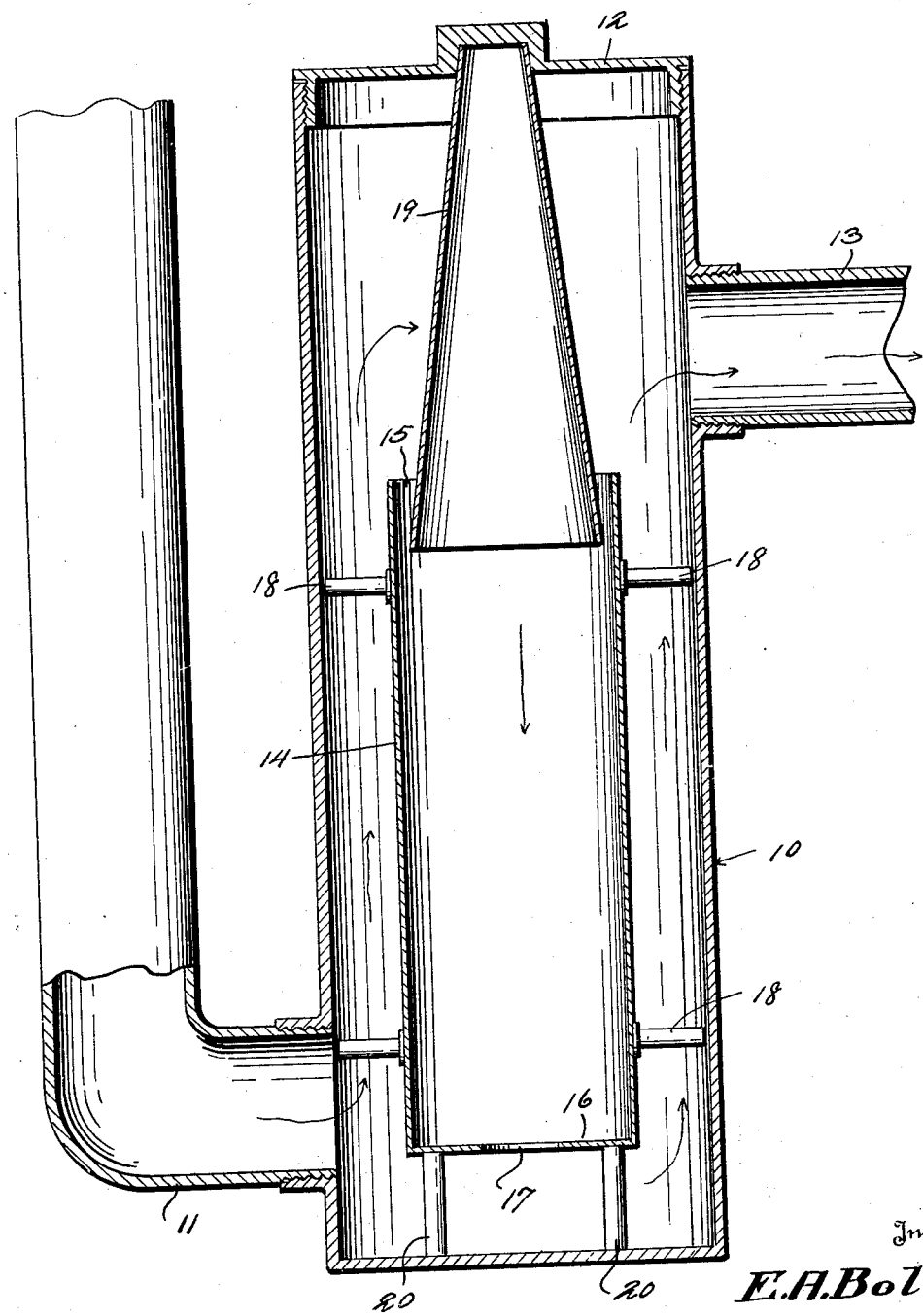

Patented Feb. 16, 1932

1,845,121

UNITED STATES PATENT OFFICE

ERNEST A. BOLT, OF EL PASO, TEXAS, ASSIGNOR OF ONE-THIRD TO ROBERT LANDER AND ONE-THIRD TO CAVEN L. NEWTON, BOTH OF EL PASO, TEXAS

WASTE TRAP

Application filed May 7, 1931. Serial No. 535,766.

The present invention relates to waste traps and has for an important object the provision of a waste trap wherein the water in the trap will not be siphoned out thereof by the passage of water in the trap.

Another object of this invention is to provide in a trap means for retaining a quantity of water in the trap so as to eliminate the necessity of providing a vent or the like, which is used for the purpose of breaking the siphon in the waste pipe.

A further object of this invention is to provide means which may be disposed in any ordinary trap whereby the siphoning of the water through the trap will be broken when the water entering the trap has ceased to flow.

The above and various other objects and advantages of this invention will in part be described in and in part be understood from the following detailed description of the present preferred embodiment, the same being illustrated in the accompanying drawing, wherein there is disclosed a longitudinal section partly in detail of a trap constructed according to the preferred embodiment of this invention.

Referring to the drawing wherein like numerals of reference designate corresponding parts throughout the several views, the numeral 10 designates generally a trap body which is connected by means of a pipe 11 to a source of water supply, and a pipe 13 connects the trap to a waste carry-off supply line. The pipe 11 is connected to the trap 10 adjacent the bottom thereof and the pipe 13 is connected to the trap 10 adjacent the upper end thereof.

In the present instance, the trap 10 has been disclosed as a cylindrical body having a lid 12 threaded into the upper end but I, of course, do not wish to be limited to this construction as this trap 10 may be of any ordinary construction which is used in waste systems.

Disposed within the trap 10, there is positioned a cylindrical return member 14 which is open at the upper end 15 thereof, the return member 14 having a bottom 16 which is provided with an opening or outlet port 17. This return member 14 is substantially cylindrical in construction and has extending outwardly from the periphery thereof a plurality of spacer arms 18 which are adapted to hold the cylinder in spaced relation to the inner surface of the trap 10. A frustro-conical pressure member 19 is secured at the apex thereof to the lower face of the closure member 12 and depends within the trap 10 and has the lower edge thereof disposed within the cylindrical return member 14. The lower end of this air pressure member 19 is preferably disposed at a point spaced downwardly from the upper end of the cylindrical member 14 and is positioned in spaced relation to the inner surface of the return member 14. The return cylinder 14 is held in spaced relation to the bottom of the trap 10 by means of supporting feet 20.

In the operation of this device, the water enters the body of the trap 10 through the supply pipe 11 and passes upwardly in the trap 10 and about the outer surface of the inner member 14. As the trap 10 fills up with water, the air disposed within the outer trap 10 will be partially forced outwardly thereof, but that portion of the trap disposed above the outlet pipe 13 will retain air therein which will be placed under pressure by the water flowing through the trap. Simultaneous with the filling of the outer member 10, the inner cylinder 14 will fill up with water which will enter the cylinder 14 through the port 17, and this water may flow outwardly of the top 15 thereof, together with the water flowing upwardly and outwardly through the outer cylinder 10. The passage of the water through the inner cylinder or casing 14 is restricted by reason of the fact that the pressure member 19 has its lower edge portion disposed in close proximity to the inner surface of the inner member 14. As the water flows through the inner member 14, the air within the pressure member 19 will be pocketed and placed under pressure by movement of water upwardly therein. When the supply of water or liquid passing through the intake pipe 11 is stopped, the water in this pipe 11 will be on a level with the lower edge of the outlet port of the trap 10, the pressure of the air disposed in the top of the trap 10 being sufficient to break the siphon as the pressure of the water in the pipe 11 decreases through the cutting off of the supply. When the supply of water in the pipe 11 is stopped, the pressure of the air within the inverted pressure member 19 will be released and any water within this pressure member will be forced downwardly in the inner member 14. In the event that the flow of liquid through the trap 10 is relatively rapid so that the siphon will not be broken before a considerable quantity of water has been drained out of the trap 10, the liquid remaining in the inner trap member 14 will be sufficient to form a seal closing the intake port of the trap 10 so that no gases can flow backwardly through the trap.

It will be obvious from the foregoing that the conventional vent pipe used with traps at present in use may be eliminated, thus saving the considerable expense of mounting this pipe within a building structure and, at the same time, a trap has been disclosed wherein a water seal will prevent the escape of gases through the trap.

While I have disclosed the cylindrical inner trap member 14 as being mounted in the outer trap 10, I do not wish to be limited to this particular construction, as the cylindrical member, together with the pressure member 19, may be mounted in any other conventional trap construction.

It is, of course, understood that various changes and modifications may be made in the details of construction and design of the above specifically described embodiment of this invention without departing from the spirit thereof, such changes and modifications being restricted only by the scope of the following claims.

I claim:—

1. In a liquid trap having an inlet and an outlet port, an inner liquid receptacle having an open top and an apertured bottom, and an inverted member supported above said receptacle and having an end disposed within the open end of the receptacle.

2. In a liquid trap having an inlet and an outlet port, an inner receptacle disposed within the trap and having an open top and an apertured bottom, means carried by the receptacle for maintaining the receptacle in spaced relation to the walls of the trap, and an inverted pressure member supported above the receptacle and having an open end portion thereof disposed within the receptacle whereby to retard the withdrawal of liquid out of the top of the receptacle while coactively permitting the flow of liquid out of the bottom of the receptacle.

3. A liquid trap of the character described comprising a casing having an inlet and an outlet port, an inner casing mounted within the first-named casing, said inner casing having an open upper end portion and an apertured bottom, and a pressure member supported above said inner casing and having an end portion disposed therein whereby to control the flow of liquid in the inner casing.

4. A liquid trap of the character described comprising an outer casing having an inlet and an outlet port, an inner casing mounted within the outer casing, means carried by the inner casing for holding the inner casing in spaced relation to the outer casing, said inner casing having an apertured bottom and an open top, and a frustro-conical pressure member supported above the inner casing and having the base thereof disposed within the inner casing and in spaced relation to the inner surface thereof.

5. In a liquid trap, a cylindrical member disposed within the trap, outstanding arms carried by the cylindrical member for holding the member in spaced relation to the walls of the trap, supporting legs carried by the bottom of the member for holding the member in spaced relation to the bottom of the trap, and means disposed within the member for restricting the flow of liquid outward of the upper end portion thereof.

6. In a liquid trap, a cylindrical liquid receptacle mounted within the trap, said receptacle having an open top and an apertured bottom, means for mounting the receptacle in spaced relation to the walls of the trap, and means supported within the receptacle for restricting the passage of liquid out of the top thereof while permitting the flow of liquid out of the bottom thereof whereby to seal the inlet port of the trap after the liquid has flowed out of the body of the trap.

7. A trap sealing member of the character described comprising a liquid receptacle having an open top and an apertured bottom, means for supporting the receptacle within a trap and a frustro-conical member supported within the open end of the receptacle whereby to restrict the passage of liquid out of the top thereof while simultaneously permitting the passage of liquid through the bottom thereof for sealing of the trap after the liquid has been drawn out of the body of the trap.

8. A liquid trap of the character described comprising an outer casing having an inlet port adjacent the bottom and an outlet port adjacent the upper end thereof, an inner casing mounted within the outer casing and in spaced relation thereto, said inner casing having upper and lower openings communicating with the interior of the outer casing, and a hollow pressure member supported in telescoping relation to said inner casing.

9. A trap of the character described comprising a cylindrical member having an inlet port adjacent the bottom thereof and an outlet port disposed at a point inwardly from the top whereby to provide an air chamber between the top and the outlet port, a threaded end member engaging one end of the cylindrical member whereby to permit ready cleaning thereof, and a pressure member supported within said member, one end of said pressure member being closed and the other end open and disposed intermediate the inlet and the outlet ports.

In testimony whereof I hereunto affix my signature.

ERNEST A. BOLT.